United States Patent [19]

Lane

[11] 3,769,892

[45] Nov. 6, 1973

[54] SEATING ARRANGEMENT FOR A REFLECTING MEMBER

[75] Inventor: William Patrick Lane, Taunton, Mass.

[73] Assignee: Polaroid Corporation, Cambridge, Mass.

[22] Filed: Dec. 6, 1971

[21] Appl. No.: 204,959

[52] U.S. Cl. .................................. 95/42, 95/13
[51] Int. Cl. ................................ G03b 19/12
[58] Field of Search ............................. 95/42, 13

[56] References Cited
UNITED STATES PATENTS

| | | | |
|---|---|---|---|
| 3,641,889 | 2/1972 | Eloranta | 95/10 CE |
| 720,694 | 2/1903 | Holst | 95/42 |
| 816,907 | 4/1906 | Garfield | 95/42 |
| 1,330,400 | 2/1920 | Sine | 95/42 |
| 3,094,913 | 6/1963 | Morelle | 95/42 |

Primary Examiner—Samuel S. Matthews
Assistant Examiner—E. M. Bero
Attorney—Brown and Mikulka

[57] ABSTRACT

In a reflex camera, an arrangement for properly positioning a reflecting member at a viewing plane and minimizing warpage to a viewing surface attached to the reflecting member. The reflecting member is pivotally moved about a hinge arrangement located along one edge of the reflecting member. The forces employed to move the reflecting member, as well as the forces used to retain the reflecting member at its viewing position are applied to the reflecting member through the hinge arrangement. In order to alleviate possible warpage, the reflecting member contacts a frame supporting it in the viewing position at a point located on a line with an area of primary stress influence created by the retaining forces. The contact point and the two hinges form a three point seating arrangement.

12 Claims, 5 Drawing Figures

INVENTOR.
WILLIAM P. LANE
ATTORNEYS

SEATING ARRANGEMENT FOR A REFLECTING MEMBER

BACKGROUND OF THE INVENTION

Reflex cameras have been developed employing a reflecting member movable between a viewing and an exposure position. Movement of the reflecting member converts the camera's optical path from a viewing to an exposure configuration. A device of this variety is described in a copending application for United States Patent entitled "Reflex Camera" by Edwin H. Land, Igor Blinow and Vaito K. Eloranta, Ser. No. 134,733 filed Apr. 16, 1971, and assigned in common herewith.

In the present camera, the reflecting member is retained in its viewing position by forces derived from an override spring. In its viewing position, the reflecting member serves to provide a viewing optical path through a viewing surface carried thereon. Since this one function of the reflecting member necessarily involves the proper positioning of the viewing surface in a specific plane within the optical path, there is a concern over manufacturing tolerances. These tolerances, associated with the correct positioning of the reflecting member at its viewing position, are difficult to obtain without recourse to sophisticated mechanical components.

In addition to properly positioning the viewing surface at a specific plane within the optical path, regard must be given to possible warpage of the viewing surface. Specifically, the reflecting member is retained in its viewing position by an override spring acting upon the reflecting member through one of its hinges. As a result, the force for retaining the reflecting member at its viewing position causes stresses which may tend to warp the viewing surface. This possibility becomes more probable when the viewing surface is formed having a relatively small thickness. As warpage increases, the possibility of obtaining a distortion free viewing image is reduced.

SUMMARY OF THE INVENTION

The present invention is addressed to an arrangement for properly positioning a reflecting member at a specific viewing plane and thereby avoiding warpage to a viewing surface fixedly attached to the reflecting member. The reflecting member is pivotally moved about a double hinge arrangement located along one edge of the reflecting member. These two hinges form two of the three points in the seating arrangement. The forces which are used to move the reflecting member between its viewing position and an exposure position, as well as forces employed to retain the reflecting member in its viewing position, are applied to the reflecting member through a hinge located proximate to one corner of the reflecting member. As such, the forces used for retaining the reflecting member at its viewing position create stresses within the reflecting member which may tend to temporarily distort or warp the viewing surface.

In order to alleviate any possible warpage to the reflecting member as a whole, the third or contact point of the three point seating arrangement is located on a line with an area of primary stress influence created by the force applied through one of the hinges. Accordingly, the forces used for retaining the viewing surface in its viewing position are allowed to act upon the viewing surface in such a manner that warpage to the viewing surface is minimized. Additionally, only these three points within the seating arrangement need to be fixed within certain manufacturing tolerances. As a result, the viewing surface is properly positioned at its specific viewing plane with minimum warpage and with small concern for manufacturing tolerances.

One object and feature of the present invention is to provide a three-point seating arrangement for properly positioning a reflecting member at a viewing plane.

Another object and feature of the present invention is to provide a seating arrangement for properly positioning and retaining a viewing surface contained upon a reflecting member at a specific viewing plane while minimizing any possible warpage to the viewing surface.

Still another object and feature of the present invention is to provide a seating arrangement for properly positioning a reflecting member at a viewing plane while minimizing concern for manufacturing tolerances of the points within the seating arrangement.

Other objects of the invention will in part be obvious and will in part appear within the specification.

The invention accordingly comprises the apparatus possessing features, techniques, and properties which are exemplified in the description to follow.

For a fuller understanding of the nature and objects of the invention, reference should be made to the following detailed description taken in connection with the accompanying drawings.

DETAILED DESCRIPTION OF THE DRAWINGS

DETAILED DESCRIPTION OF THE DRAWING

Figure 1:
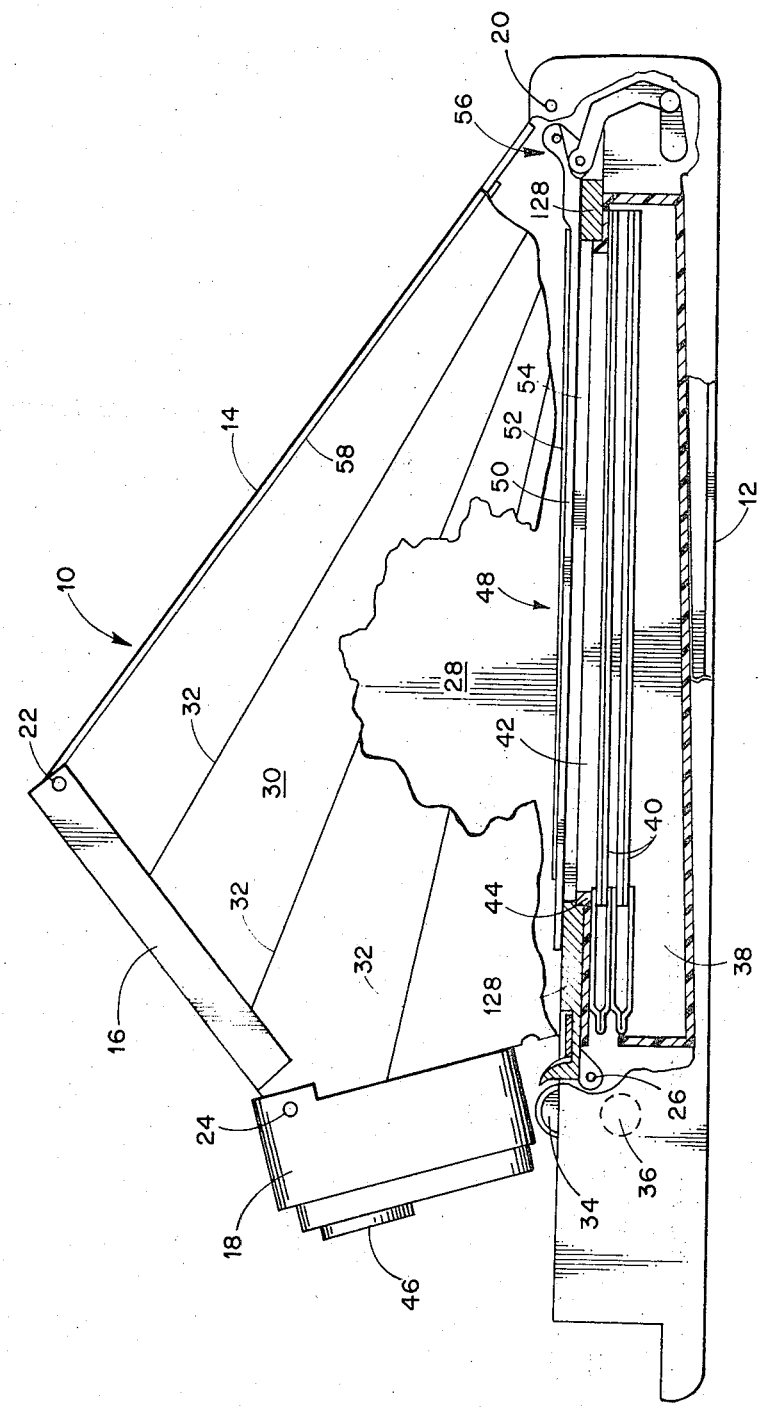
FIG. 1 is a side elevational view of a reflex camera incorporating the present invention with portions broken away to more clearly show internal detail.

Referring to FIG. 1 of the drawings, there is shown a camera 10 of the extensible type, the camera being shown in its extended or operative position. Camera 10 includes a plurality of housing sections 12, 14, 16 and 18 suitably pivoted to each other about axes 20, 22, 24, and 26, respectively, for movement between their extended positions shown and a folded position (not shown). Housing sections 12, 14, 16 and 18 cooperate with each other, in their extended positions, to define four sides of a six-sided exposure chamber 28, the remaining two sides of the chamber 28 being defined by a flexible bellows 30 formed of any suitable opaque material. Flexible bellows 30 may include a plurality of creases 32 for insuring that bellows 30 collapses in a predetermined manner when camera 10 is folded.

Housing section 12 includes an apparatus (not shown) for mounting a pair of motor driven processing rollers 34 and 36. Rollers 34 and 36 are positioned in front of a film container 38 containing a plurality of film units 40. The uppermost one of film units 40 is located in position for exposure by light transmitted through an exposure aperture 42 located in a wall 44 of container 38.

For a more detailed description of such a camera 10, reference should be made to a photographic apparatus described and claimed in a copending application for United States Patent by Edwin H. Land entitled "Reflex Camera," filed Apr. 4, 1970, Ser. No. 28,567, and assigned in common herewith. The above identified application employs the term "reflex operator member" in identifying a pivotally movable element contained within camera 10. While a similar element is contained within the present invention, it is referred to in this application as a "reflecting member."

The optical system for camera 10 generally includes a lens and shutter assembly 46, a mirror 58 mounted on an interior wall of housing section 14, a reflecting member 48 and a rangefinder/viewfinder (not shown). Reflecting member 48 includes a carrier portion 50 which supports a Fresnel-type mirror 52 on its upward side (as seen more clearly in FIG. 5) and a generally planar mirror 54 on its opposite side. Reflecting member 48 is pivotally mounted to camera 10 about two hinges 56 and 74 for movement between an exposure position adjacent housing section 14 and a viewing position in which reflecting member 48 is in overlying relationship to exposure aperture 42.

During operation of camera 10, reflecting member 48 is initially in its position as shown in FIG. 1. The image of the subject to be photographed is transmitted by the camer's objective lens 46 into exposure chamber 28 wherein it is reflected by mirror 58 onto Fresnel-type mirror 52 and then into the camera's viewfinder. After the image has been focused, the camera's shutter release (not shown) is actuated to close the shutter and viewfinder apertures and stop the entry of all actinic light into exposure chamber 28. Reflecting member 48 is then spring driven to its exposure position adjacent mirror 58. When reflecting member 48 has reached its exposure position, the shutter is activated to make the exposure, and the image is directed toward the uppermost one of film units 40 by planar mirror 54.

Figure 3:
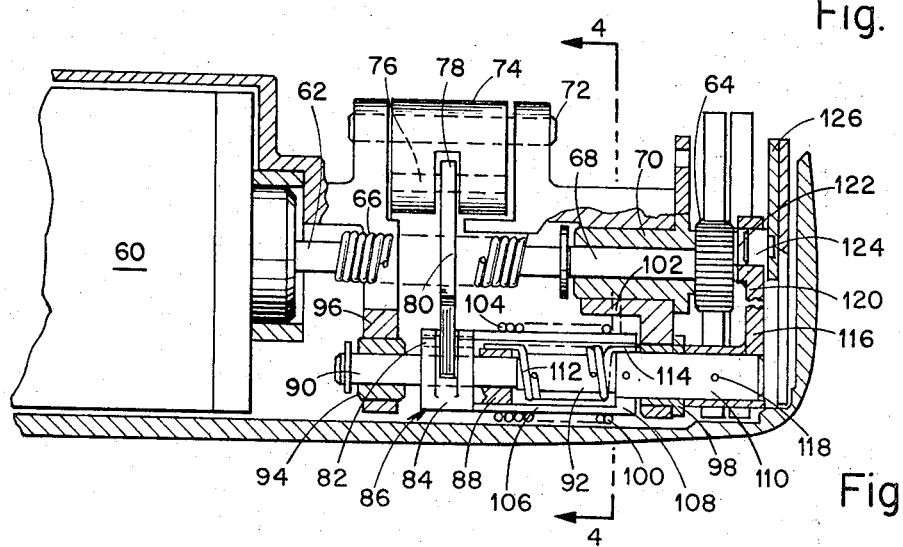
FIG. 3 is an enlarged fragmentary view of the rear of the camera with portions broken away to reveal internal structure.
Figure 4:
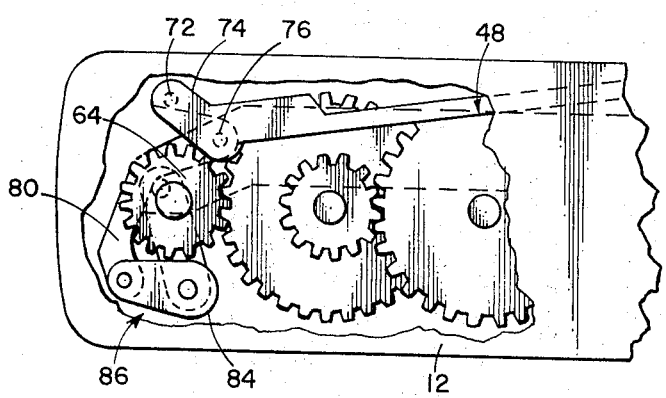
FIG. 4 is an enlarged sectional view of the rear portion of the camera taken through plane 4—4 of FIG. 3.

Referring additionally to FIGS. 3 and 4, the motorized drive components positioned along the rearward edge of housing section 12 are revealed in detail along with the spring-driven mounting for reflecting member 48. An electric motor 60 is attached to the rear portion of housing section 12 and is operative to supply power for a variety of camera operations as well as for driving processing rollers 34 and 36. An output shaft 62 of motor 60 is connected to an input gear 64 through a spring-type slip clutch 66. Spring 66 is frictionally attached between output shaft 62 and a drive shaft 68, connected to gear 64. Shaft 68 is fixed to gear 64 and is rotatably supported within a bushing 70 formed as part of housing section 12 of camera 10. Spring 66 is configured to release from its frictional engagement between shafts 62 and 68 should the load imposed upon motor 60 exceed a predetermined limit.

Reflecting member 48 is driven between its operational positions by a four-bar linkage assembly. The components of this four-bar linkage include a pivotal coupling at a shaft 72 of hinge extension 74 of reflecting member 48. Hinge extension 74 is configured to retain another shaft 76 spaced inwardly from shaft 72 and contains an access slot 78 within which pivotal connection between shaft 76 and a draw-down link 80 is effected. Draw-down link 80 is pivotally connected through a shaft 82 to the tip of a dual arm portion 84 of a bell crank shown generally at 86. Forming the final component of the four-bar linkage, a hub portion 88 of bell crank 86 is rotationally mounted upon a necked-down portion 90 of a cylindrical shaft 92. Portion 90 of shaft 92 is rotatably supported within a bushing 94 which is in turn fixed to an extension 96 of housing section 12. The opposite end of shaft 92 is rotatably supported within a bushing 98 formed within a portion of housing section 12.

Reflecting member 48 is retained in its viewing position by virtue of an outward orientation of dual arm portion 84 of bell crank 86. Reflecting member 48 is driven to its exposure position, as well as returned to its viewing position, by a driving force exerted from bell crank 86 through draw-down link 80. A low-rate torsion spring 100 is employed for powering bell crank 86 to drive reflecting member 48 into its exposure position. One end 102 of spring 100 is fixed to housing section 12 while its opposite end 104 is configured to engage a portion (not shown) of a cylindrically shaped sleeve 106. Sleeve 106 is formed as a hollow cylinder having a thickened end portion 108, a portion of which is bored to fit over a stepped-up portion 110 of shaft 92.

Mounted coaxially with spring 100, and contained within sleeve 106, is a torsion override spring 112. One end 114 of spring 112 is connected within the thickened portion 108 of sleeve 106 while its opposite end is connected to bell crank 86. Spring 112 is selectively prewound and is of sufficient strength to urge bell crank 86 upwardly into contact with a portion (not shown) of sleeve 106 such that further rotation of sleeve 106 will result in rotation of bell crank 86.

Following an exposure interval, motor 60 is energized to drive upper roller 34 and cock reflecting member 48. The latter operation is carried out by rotatably driving shaft 92 through its connection with a drive bell crank 116 mounted on the outward end of shaft 92. Bell crank 116 is fixed to stepped-up portion 110 by a pin 118 extending therethrough and includes an upwardly extending arm portion 120. The tip of arm portion 120 contains a hole 122 for providing a pivotal connection with a pin 124 integrally formed as part of a reduction assembly output link 126.

With the arrangement described, when shaft 92 is rotated during a cocking cycle, rotational force will be transmitted through both override spring 112 and sleeve 106 into bell crank 86. Rotation of sleeve 106 from shaft 92 also winds drive spring 100 through a connection between the latter two elements. As connected sleeve 106 and bell crank 86 are rotated, reflecting member 48 is repositioned by the four bar linkage into its viewing position adjacent the exposure plane as shown in FIG. 1.

Override spring 112 provides a lost-motion or override function which permits motor 60 to operate for a selected interval of time following the return of reflecting member 48 to its viewing position. During this operation, override spring 110 absorbs the energy from motor 60. It is this amount of absorbed energy which is employed for retaining reflecting member 48 at its viewing position subsequent to motor 60 shut-off.

Figure 2:
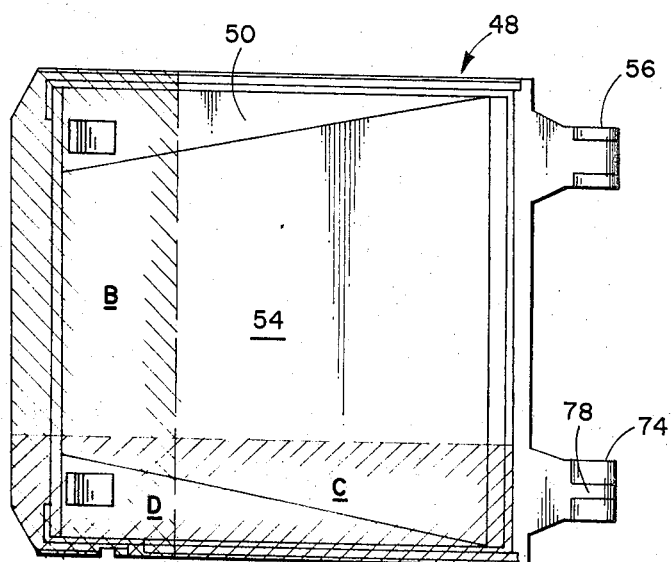
FIG. 2 is a bottom view of a reflecting member according to the present invention.
Figure 5:
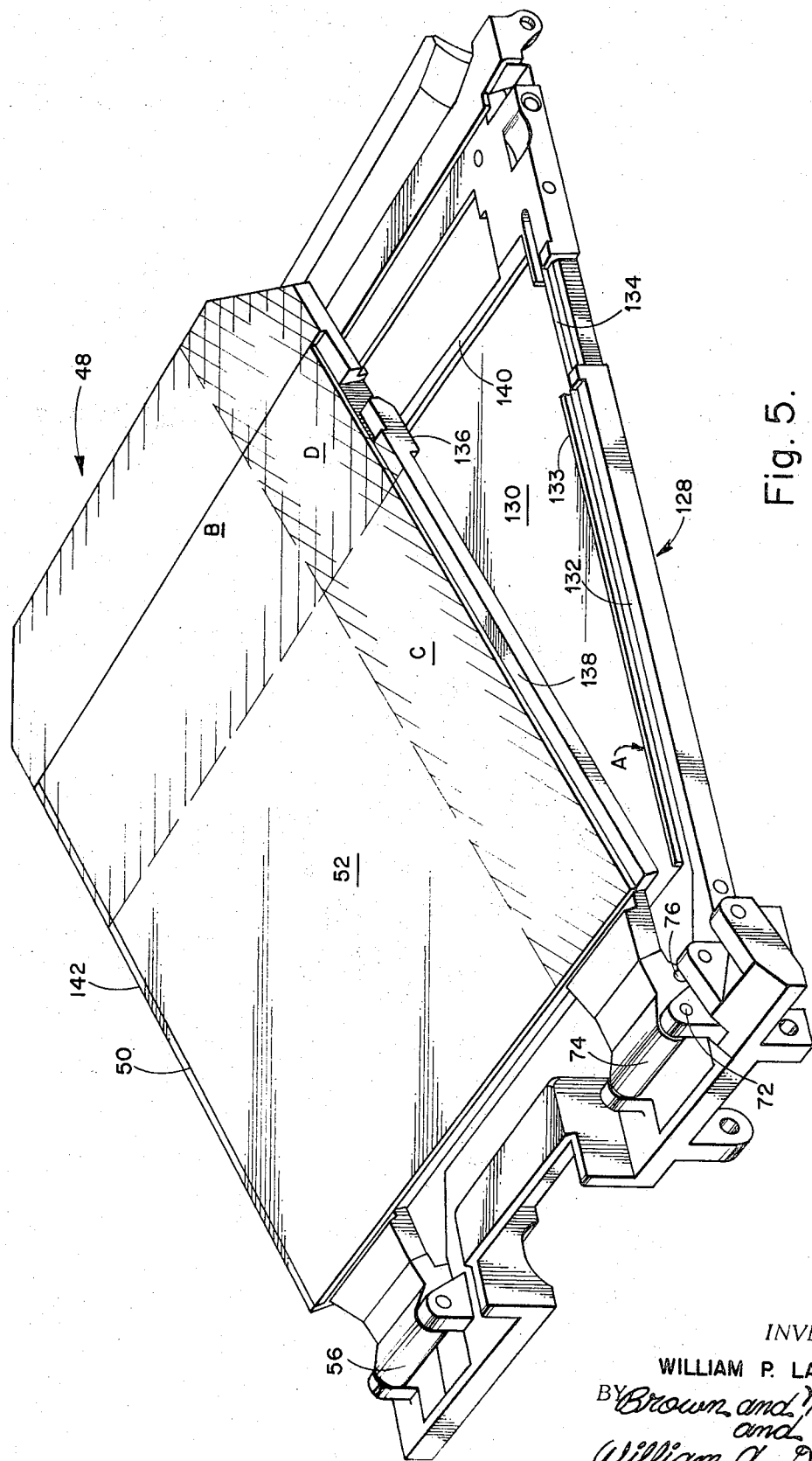
FIG. 5 is a perspective view of the reflecting member and its support frame during one segment of a photographic cycle.

Looking at FIGS. 2 and 5, there is shown the seating arrangement for reflecting member 48 at its viewing position. As previously noted, reflecting member 48 is supported for rotation by two hinges 56 and 74. Hinges 56 and 74 are integrally formed as extensions of an inner frame assembly shown generally at 128. Inner frame 128 is a generally rectangular shaped flat member having a rectangular aperture 130 commensurate in size with that of exposure aperture 42 of film container 38. Aperture 130 permits light to pass from exposure chamber 28 onto uppermost film unit 40 for purposes of effecting an exposure. Inner frame 128 is fixedly attached to a support structure (not shown) surrounding the upper periphery of film container 38 by any suitable means, e.e., rivets. Mounted as such, inner frame 128 supports reflecting member 48 in overlying relationship with uppermost film unit 40 when the former is in its viewing position. Positioned along a lateral edge 132 of inner frame 128 is a reflecting member landing 134. In the preferred embodiment shown, landing 134 is recessed into lateral edge 132 a small amount. A contact point 136, located along the corresponding lateral edge 138 of reflecting member 48, is configured to engage landing 134 when reflecting member 48 is driven into its viewing position. Contact point 136 is located along the bottom portion of lateral edge 138 and is engineered to within specific manufacturing tolerances, as is landing 134 and hinges 56 and 74. Accordingly, the problem of possible non-uniformity of frame 128 is by-passed and concern over manufacturing tolerances is essentially directed only to the four areas discussed and not to the reflecting member and inner frame as a whole, as is requisite in the situation shown in the embodiment application Ser. No. 28,567.

In a preferred embodiment, reflecting member 48 includes a re-entrant flange (not shown) which extends around the periphery of reflecting member 48. The flange is configured to cooperate with a raised lip portion 133 formed on inner frame assembly 128 to form a lighttight seal about the forwardmost film unit 40 thereby protecting it from premature exposure during the viewing process. For a more detailed disclosure of the lighttight seal reference should be made to a co-pending application of Edwin H. Land entitled "Photographic Apparatus" Ser. No. 88,847, filed Nov. 12, 1970, and assigned to the assignee of the instant application.

Latitude in manufacturing tolerances is also related to the location of the landing 134 and contact point 136. Landing 134, as well as contact point 136, are placed a relatively large distance away from the axis of rotation, in this instance proximate to the front edge 140 of inner frame 128 within an area B shown in shaded lines. Should the contact point and landing be moved toward the axis of rotation, the manufacturing tolerances of both points becomes more critical. For instance, a variation of 1/10 inch height on the contact point if placed at point A would seriously alter the plane in which reflecting member 48 rests. However, by placing the contact point and landing within area B, a 1/10 inch height variation would produce a smaller alteration in the plane in which the reflecting member 48 will rest.

A second concern which affects the placement of contact point 136 and landing 134 relates to possible warpage of carrier 50 and Fresnel 52. Specifically, the forces derived from override spring 112 which are employed for retaining reflecting member 48 at its viewing position are applied to reflecting member 48 through hinge extension 74. Since the forces derived from spring 112 are applied to one corner of reflecting member 48, there is a tendency for both the carrier and the Fresnel to distort or warp if not properly seated in the viewing position. In particular, the force applied to hinge extension 74 creates a stress throughout the entire reflecting member 48. This stress has an area of primary influence normal to the axis of rotation at a portion along extension 74 through which the forces are applied to reflecting member 48. The stress across reflecting member 48, should it go unchecked, has the tendency of creating stains within the carrier and the Fresnel thereby causing them to distort or warp. This tendency is greatly increased when the contact point and landing are unsuitably positioned, allowing the retaining force to cause distortions rather than retain the carrier 50 and Fresnel 52 in their viewing positions.

In order to alleviate possible warpage or distortion, the contact point and landing are placed proximate to the area of primary stress influence extending from hinge extension 74. The line of primary stress extends along a path C shown in shaded lines in FIGS. 2 and 5. Therefore, a contact point located within shaded area C is relatively close to the major stress lines extending from hinge 74, and as such, would be in a position to halt reflecting member 48 before the forces applied through hinge 74 would tend to distort carrier 50 and Fresnel 52. In particular, if the contact point 134 is placed external to shaded area C, e.g., along lateral edge 142, then reflecting member 48 would contact inner frame 128 at a point removed from the primary line of stress. Accordingly, a moment arm would be set up across carrier 50 and Fresnel 52 having a size approximately equal to the width of carrier 50. As such, a portion of lateral edge 138 will be forced into a slightly lower position than lateral edge 142, thereby resulting in some distortion or warping of Fresnel 52. In order to reduce this distortion, due to a large moment arm, the contact point 136 is placed such that the moment arm is minimized. As a result, the forces derived from override spring 112 are directed through assembly 128 along shaded area C and bear directly upon a contact point positioned thereon. Since the moment arm is minimized, little or no distortion or warpage will occur and a planar, or essentially planar, viewing surface will exist.

As may be evidenced from FIG. 5, there exists an area D located upon reflecting member 48 which is common to both areas B and C. A contact point and landing positioned within this common area D exhibits both the nonwarpage qualities of area C and the manufacturing tolerances required within area B. Therefore, by placing contact point 136 and landing 134 within area D there is realized a greater latitude of manufacturing tolerances and a minimization of possible distortion and warpage of carrier 50 and Fresnel 52. There is, however, one zone within area D which may not be used for stationing a contact point. This zone is best seen in FIG. 2 as the portion of area D which includes part of mirror 54. A contact point may not be positioned upon mirror 54 due to probable interference with the image to be photographed when reflecting member 48 is in its exposure position adjacent rear wall 14. Also excluded for use within the present embodiment is that portion of area D which does not have a possible supportive counterpart on inner frame 128 when reflecting member 48 is moved into its viewing position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a reflex camera, the combination comprising:
   reflecting means pivotally movable between a viewing position and an exposure position;
   frame means;
   hinge means for pivotally connecting said reflecting means with said frame means, said hinge means providing an axis of rotation on said frame means about which said reflecting means is moved between said viewing position and said exposure position said hinge means defining two points of a three point landing arrangement;
   spring means adapted for retaining said reflecting means at said viewing position, the force from said spring means producing a stress in said reflecting means, said stress being applied along said reflecting means through at least a portion of said hinge means and having an area of primary influence upon said reflecting means extending from said portion of said hinge means through which said stress is applied; and
   contact means positioned on said reflecting means for providing one supportng point of said three point landing arrangement for said reflecting means at its said viewing position, said contact means being engageable with only a small predetermined area of said frame means, said contact means being removed from said axis of rotation and being further located within the area of primary stress influence upon said reflecting means for minimizing the strain through said reflecting means, whereby distortion of said reflecting means by warpage when retained in said viewing position is substantially avoided.

2. The reflex camera of claim 1 in which said reflecting means is positioned in covering relationship with said frame means when said reflecting means is in its said viewing position, said frame means containing an aperture formed therein for permitting light to pass through said frame means toward a piece of photosensitive material when said reflecting means is in its said exposure position.

3. The reflex camera of claim 2 in which said frame means is configured having a small predetermined area thereon contactable by said contact means, said small predetermined area on said frame means providing a support for said contact means for stopping said pivotal motion of said reflecting means at its said viewing position.

4. The reflect camera of claim 3 in which said small predetermined area on said frame means is positioned remote from said axis of rotation and proximate to a normal to said portion of said hinge means through which said stress is applied on said reflecting means when said reflecting means is in its said viewing position, said predetermined area on said frame means providing a landing for said contact means when said reflecting means is moved into its said viewing position.

5. The reflex camera of claim 4 in which said landing on said frame means is indented into said frame means and said contact means extends from said reflecting means, said landing and said contact means being contactable when said reflecting means is in its said viewing position.

6. The reflex camera of claim 1 in which said hinge means is a pair of hinges located along one edge of said frame means, each of said hinges being positioned at the adjacent corners of said reflecting means at the edge of said reflecting means closest to said axis of rotation, said pair of hinges and said contact means providing a three point seating arrangement for said reflecting member.

7. The reflex camera of claim 6 in which said force from said spring means is applied to said reflecting means through only one of said hinges.

8. The reflex camera of claim 7 in which said force from said spring means applied through said one hinge creates a stress throughout said reflecting means when said reflecting means is retained at its said viewing position, said stress having said area of primary influence on said reflecting means extending normally from the axis of rotation of said one hinge and having a width substantially equal to the width of said one hinge.

9. The reflex camera of claim 8 in which said small predetermined area of said frame means is located along a lateral edge of said frame means, said lateral edge being adjacent to said one hinge means through which said force from said spring means is applied to said reflecting means.

10. The reflex camera of claim 9 in which said contact means and said small predetermined area on said frame means are located at a position removed from said axis of rotation, and are further positioned on said lateral edge of said reflecting means and of said frame means proximate said area of primary stress influence for reducing the moment arm through said reflecting means when said reflecting means is at its said viewing position and said force from said spring means is applied through said one hinge for retaining said reflecting means at its said viewing position.

11. The reflex camera of claim 1 in which said reflecting means comprises:
    carrier means pivotally movable between said viewing position and said exposure position;
    viewing surface means formed on one side of said carrier means for establishing a viewing configuration for said camera when said carrier means is in its said viewing position; and
    mirror means formed on the opposite side of said carrier means from said viewing surface means for providing an exposure configuration for said camera when said carrier means is in its said exposure position.

12. The reflex camera of claim 11 in which said contact means is formed on said carrier means.

* * * * *